United States Patent
Jun

(10) Patent No.: US 6,583,822 B1
(45) Date of Patent: Jun. 24, 2003

(54) TIMING RECOVERY DEVICE OF DIGITAL TV

(75) Inventor: Jung Sig Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/467,374

(22) Filed: Dec. 21, 1999

(30) Foreign Application Priority Data

Dec. 31, 1998 (KR) .............................. 98-62823

(51) Int. Cl.[7] .............................. H04N 5/04; H04N 5/06
(52) U.S. Cl. ...................... 348/537; 348/725; 348/516; 348/521; 348/536; 375/355
(58) Field of Search ................................ 348/500, 516, 348/521, 524, 540, 536, 537, 725, 21, 572; 375/327, 376, 316, 354, 355, 357

(56) References Cited

U.S. PATENT DOCUMENTS

| | | | | |
|---|---|---|---|---|
| 5,541,552 A | * | 7/1996 | Suzuki et al. ............... | 329/307 |
| 5,657,089 A | * | 8/1997 | Onagawa .................... | 348/537 |
| 5,818,544 A | * | 10/1998 | Han ........................... | 348/725 |
| 5,877,816 A | * | 3/1999 | Kim ........................... | 348/526 |
| 5,959,682 A | * | 9/1999 | Kim et al. .................. | 348/511 |
| 6,014,177 A | * | 1/2000 | Nozawa ...................... | 348/540 |
| 6,055,284 A | * | 4/2000 | Kweon ....................... | 375/355 |
| 6,226,049 B1 | * | 5/2001 | Oh ............................. | 348/607 |
| 6,249,559 B1 | * | 6/2001 | Jun ............................. | 375/376 |
| 6,281,945 B1 | * | 8/2001 | Jun et al. .................... | 348/678 |
| 6,295,325 B1 | * | 9/2001 | Farrow et al. .............. | 375/327 |

OTHER PUBLICATIONS

"A Symbol Timing Recovery Using the Segment SYNC Data for the Digital HDTV GA VSB System" by Kibum Kim et al, 1996 IEEE, pp. 651–656.*

* cited by examiner

Primary Examiner—John Miller
Assistant Examiner—Jean W. Désir
(74) Attorney, Agent, or Firm—Birch, Stewart, Kolasch & Birch, LLP

(57) ABSTRACT

A timing recovery device in a digital television receiver using a VSB system is disclosed. In the present invention, the timing recovery device independently determines whether the detected hsync signal is reliable and operates if the detected hsync signal is reliable.

6 Claims, 4 Drawing Sheets

TIMING RECOVERY DEVICE OF DIGITAL TV

BACKGROUND OF THE INVENTION

1. Field of the Invention

The present invention relates to a digital television receiver and more particularly to a timing recovery device in a digital television receiver using a vestigial side band (VSB) system.

2. Discussion of Related Art

As the next generation of digital TV system, the High Definition Television (HDTV) has been continually developing to ultimately bring the theater right into the living room of a viewer. When compared with an existing analog TV, a digital TV not only has a higher resolution and a larger size in the horizontal direction, but produces a vivid sound comparable to a compact disc via a multi-channel. However, due to the many ways to transmit the data, a standardization of the digital TV (DTV) is still being settled among companies mainly in U.S.A, Europe and Japan.

In U.S.A., a VSB system proposed by Zenith has been adapted as a transmission format, a Motion Picture Expert Group (MPEG) has been adapted as a video compression format, a Dolby AC-3 has been adapted as an audio compression format, and an existing but compatible display method has been adapted as a display format. To transmit compressed image data under the above standards for a DTV, an error correction coding (ECC) is executed on the compressed image data. Particularly, a synchronizing signal is inserted between data at predetermined periods before transmission, thereby facilitating the recovery of the data at a receiving side.

The synchronizing signal is classified into two kinds, where one is a horizontal synchronizing (hsync) signal commonly called 'a data segment synchronizing signal', and the other is a vertical synchronizing (vsync) signal commonly called 'a field synchronizing signal'. The hsync and vsync signals of the digital TV differ from the horizontal and vertical synchronizing signals of a National Television System Committee (NTSC) television.

FIG. 1 shows a transmission signal frame of the digital TV in a VSB system. As shown, one frame is comprised of two fields, where each field includes 313 data segments and where each data segment includes 832 symbols of 4 hsync signals and 828 data symbols. Because the hsync signal does not undergo the ECC process, each data segment includes 4 symbols of hsync signal and 828 symbols of ECC signal. Also, one of the 313 data segments in each field is a vsync segment containing a training sequence and the remaining 312 are general data segments.

Also, before transmission from a transmitting side such as a broadcasting station, the signal to be transmitted is passed through a mapper by which the signal is changed into desired power levels. For a terrestrial broadcasting type of 8 VSB, the output level of the mapper corresponds to one of 8-step symbol values (amplitude level) −7, −5, −3, −1, 1, 3, 5, 7. Moreover, according to a predetermined agreement, the mapper forcibly inserts the 4 symbols of the hsync signal for every 832 symbols and forcibly inserts the vsync signal in the position of every 313th data segments.

Furthermore, with two logic levels, a prescribed logic level of the hsync signal '1, 0, 0, 1' is continually repeated in every data segment. The output level of the mapper is '5' if the hsync signal is in a logic level of '1' and the output level of the mapper is '−5' if the hsync signal is in a logic level of '0'. Namely, the hsync signal has only the two logic levels, which are continually repeated in every data segment.

FIG. 2 shows a receiving side such as a digital TV receiver in the related art. The receiving side receives a Radio Frequency (RF) signal modulated by a VSB mode through an antenna. A tuner 21 tunes the RF signal to select a frequency of a desired channel and converts the selected frequency into an Intermediate Frequency (IF). A Frequency Phase Locked Loop unit (FPLL) 22 demodulates the IF signal into base band signals I and Q, and locks both the frequencies and the phases. Specifically, the FPLL 22 is a circuit integrating a frequency tracking loop FLL and a phase locked loop (PLL). Thus, the FPLL unit 22 first locks a frequency and upon locking the frequency, locks a phase.

The Q signal is used for the recovery of a carrier in the FPLL 22 while an analog-to-digital (A/D) converter 23 converts the I signal from the FPLL 22 into a digital signal of fixed bits (for example 10 bits). Using the digital signal of fixed bits, the sync signal recovery unit 24 recovers the hsync signal and the field synchronizing signal inserted by the transmission side. The synchronizing signals are used in a timing recovery and an equalization.

Particularly, the synchronizing signals are output to an equalizer/ECC 26. The hsync signal and the field synchronizing signal may be interfered by linear distortion of amplitude and ghost resulting from signal reflections off of structures such as buildings and mountains. Accordingly, the equalizer/ECC 26 conducts an equalization utilizing the restored hsync signal and the field synchronizing signals as training signals to correct interferences to the data, and conducts ECC to correct any errors caused during the transmission through the transmission channel. A video decoder 27 then decodes the equalized and error corrected signal utilizing a Moving Picture Expert Group (MPEG) algorithm and the decoded signals are displayed to the viewers.

Moreover, data is transmitted according to an Advanced Television Systems Committee (ATSC) VSB transmission system proposed in a U.S. digital TV. At the receiving side, as shown in FIG. 2, a same clock as was used in the transmitting side should be generated to recover the transmitted data. This timing recovery is generated by implementing a timing recovery unit 25. Under the current proposed ATSC standard, the timing recovery is implemented by using the hsync signals inserted by the transmitting side.

FIG. 3 is a block diagram of a timing recovery device of a digital TV in the related art. As shown, the timing recovery unit 25 includes a timing error detector 31 which extracts the timing error information from the digital signal output by the A/D converter 23; a loop filter 32 which filters only a low frequency signal component of the timing error information; and a voltage controlled oscillator (VCO) 35 which converts an output frequency in accordance with the low frequency signal component of the timing error information to adjust the sampling timing of the A/D converter 23. In this case, the timing error detector 31 receives a control signal from the synchronizing recovery unit 24 to determine a section of the digital signal for performing a timing recovery. Particularly, FIG. 4 shows a block diagram of a hsync signal recovery unit 24 as disclosed in a co-pending application Ser. No. 09/131,387 entitled "Signal Recovery System," which is fully incorporated herein.

As shown in FIG. 4, the signal recovery unit 24 includes a correlating detector 41 which determines a correlation relation of the digital signal output by the A/D converter 23 with a known hsync signal pattern, i.e. searches for successive groups of the four symbols of the hsync signal within the digital signal; an integrator 42 which adds the data output by the correlating detector 41 for a period of 832 symbols to distinguish the hsync signal section from the data section; a slicer 43 which compares the output value of the integrator 42 with a first predetermined threshold value and outputs a signal indicating the hsync signal section if the output value is over the first predetermined threshold value; and a confidence counter 44 which checks the reliability of the hsync signal section output by the slicer 43 and outputs the control signal indicating a recovery of the hsync signal and the recovered hsync signal if the checked reliability is above a second predetermined value.

Accordingly, the timing error detector 31 of the timing recovery unit 25 extracts the timing error information from the digital signal output by the A/D converter 31 and determines the section of the digital signal for operation, i.e. the hsync signal section, using the control signal from the sync signal recovery unit 24. Thus, upon a recovery of the hsync signal by the sync signal recovery unit 24, the timing error detector 31 initiates the detection of the timing error information within the detected hsync signal section.

The loop filter 32 then filters only the low frequency signal component of the timing error information extracted by the timing error detector 31 using the control signal, to thereby output the filtered signal to the VCO 35. The VCO 35 converts the output frequency in accordance with the low frequency signal component of the timing error information and adjusts the sampling timing, i.e. the A/D clock of the A/D converter 23. The A/D converter 23 is synchronized to the recovered A/D clock and converts the analog signal into the digital signal according to the A/D clock. Thus, the timing recovery unit 25 serves to recover the timing to be used as an A/D clock of the A/D converter 23 using the hsync signal detected by the sync signal recovery unit 24.

Generally, the sync signal recovery unit 24 may lose the once recovered hsync signal due to noise or because the received signal may not be fully synchronous to the A/D clock generated in the receiver. Because the timing recovered by the timing recovery unit 25 is used to adjust the A/D clock, the system would be more efficient if the timing recovery unit 25 stops operating when the hsync signal section is erroneously detected.

However, in the above system, the timing recovery unit 25 may continue to perform timing recovery, regardless of whether the hsync signal section is erroneously detected. For example, the reliability of a correctly recovered hsync signal may be stacked and have well passed the second predetermined value. As a result, even if the once recovered hsync signal is lost, thereby reducing the reliability of the confidence counter 44, the sync signal recovery unit 24 would continue to output the control signal indicating a recovery of the hsync signal until the reliability falls below the predetermined value. Accordingly, the timing recovery unit 25 would continue to perform timing recovery utilizing an erroneously recovered hsync signal.

Moreover, the hsync signal section may slip by, for example, 1 symbol when the received signal is not fully synchronous to the A/D clock generated by the timing recovery unit 25. In such case, the sync signal recovery unit 24 may also continue to output the control signal indicating a recovery of the hsync signal and the timing recovery unit 25 would perform timing recovery on the position where the hsync signal is slipped by 1 symbol, until the reliability falls below the predetermined value. Once the hsync signal is re-recovered, the timing recovery is re-initiated and performed from scratch without regard to the previously generated clock, even when the hsync signal section has been slipped by a few symbols.

SUMMARY OF THE INVENTION

Accordingly, an object of the present invention is to solve at least the problems and disadvantages of the related art.

An object of the present invention is to provide an efficient timing recovery device in a digital TV to improve the performance of a digital TV receiver.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a timing recovery device in a digital TV includes a sync signal recovery unit which obtains a correlation value of an input signal with a known hsync signal, integrates the obtained value during a predetermined time, compares the integrated value with a predetermined threshold value, and outputs a control signal indicating a recovery of the hsync signal if the recovered hsync signal section has a minimum reliability; and a timing recovery unit controlled by the correlation value and the control signal from the hsync signal recovery unit to perform timing recovery.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Figure 5:
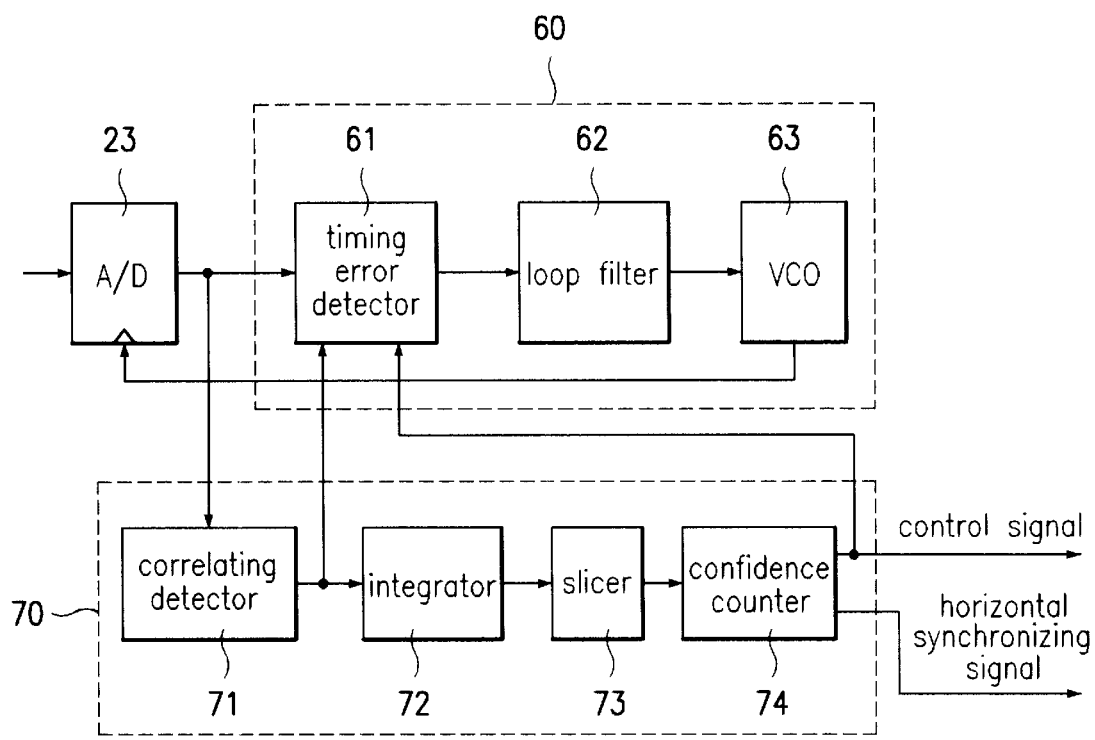
FIG. 5 is a block diagram of a timing recovery device of a digital TV according to an embodiment of the present invention.

Reference will now be made in detail to the preferred embodiments of the present invention, examples of which are illustrated in the accompanying drawings. FIG. 5 shows a block diagram of a timing recovery device usable in a digital TV according to the present invention, which includes an A/D converter 23, a timing recovery device 60 and a sync signal recovery unit 70, all operatively coupled.

Figure 1:
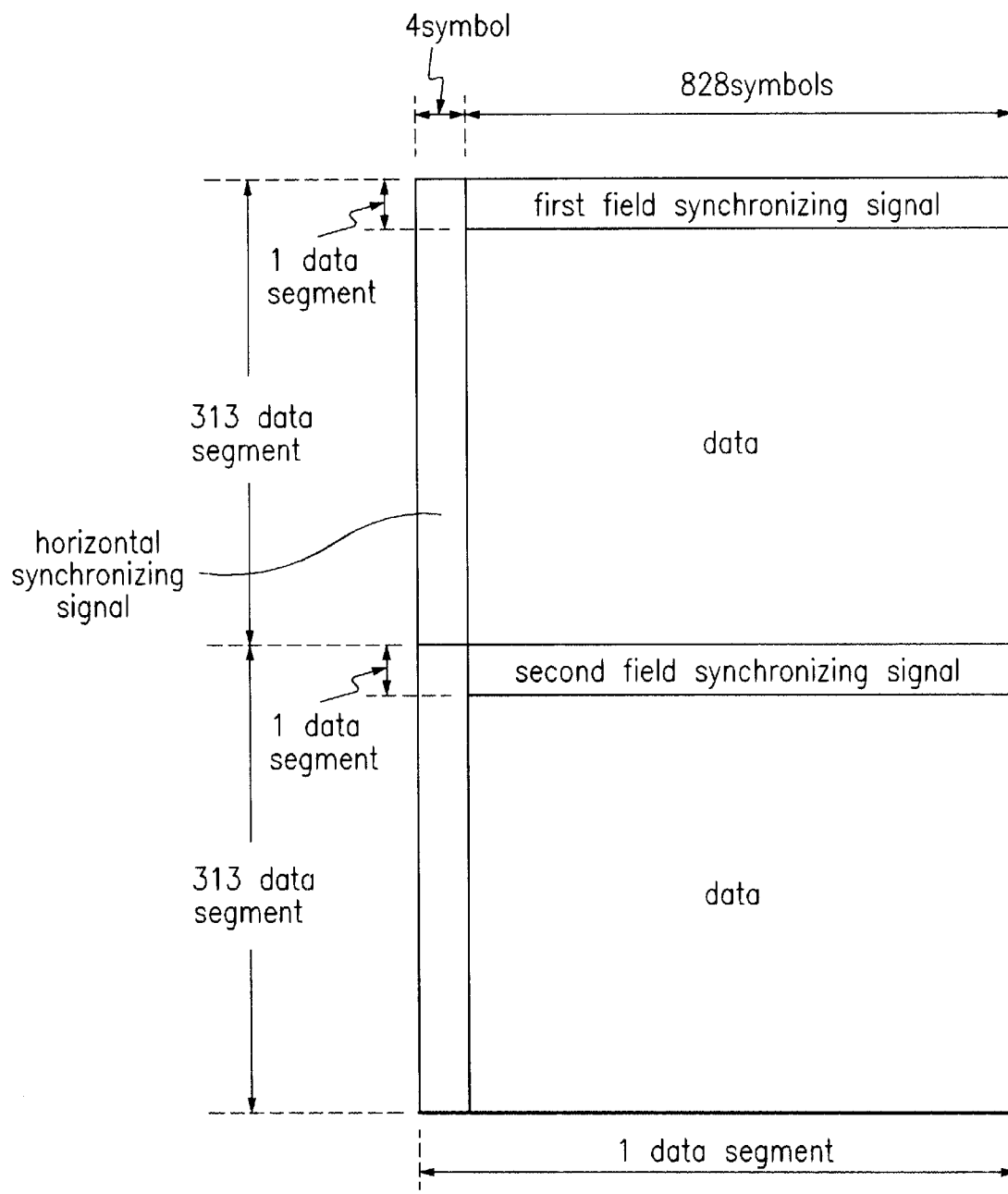
FIG. 1 shows a data frame structure of a digital TV in the related art.
Figure 2:
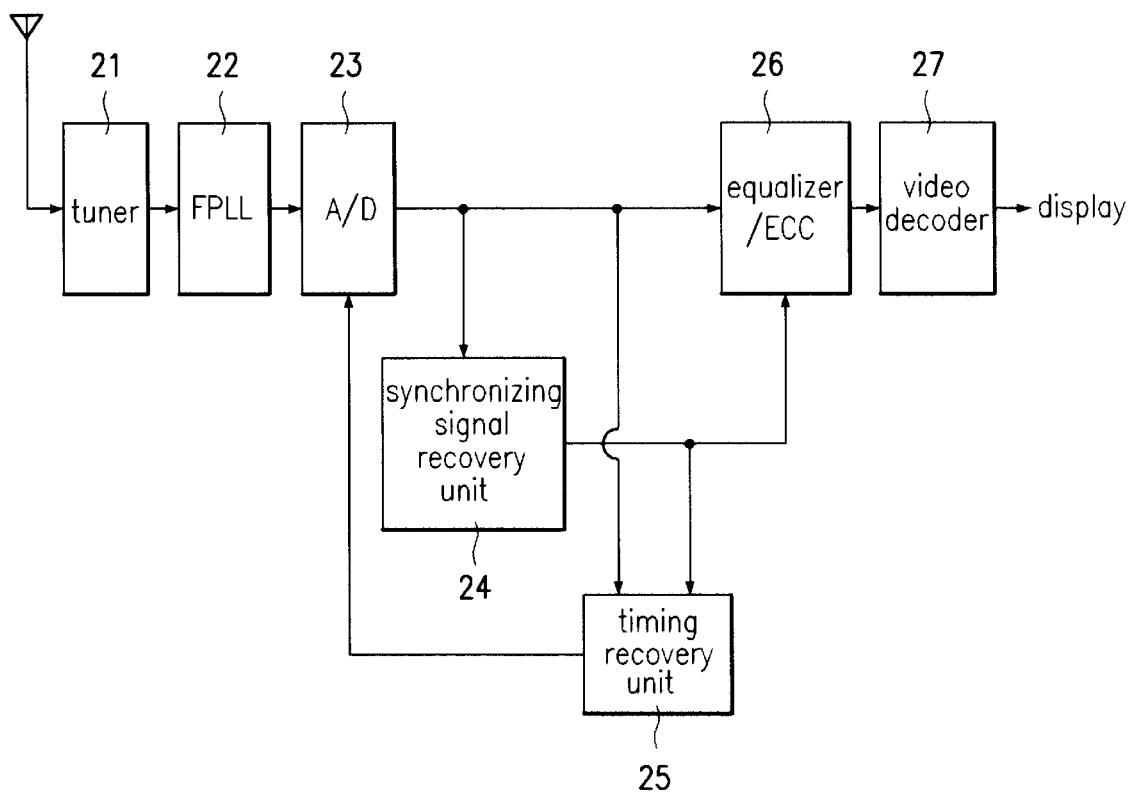
FIG. 2 is a block diagram of a digital TV receiver in the related art.
Figure 3:
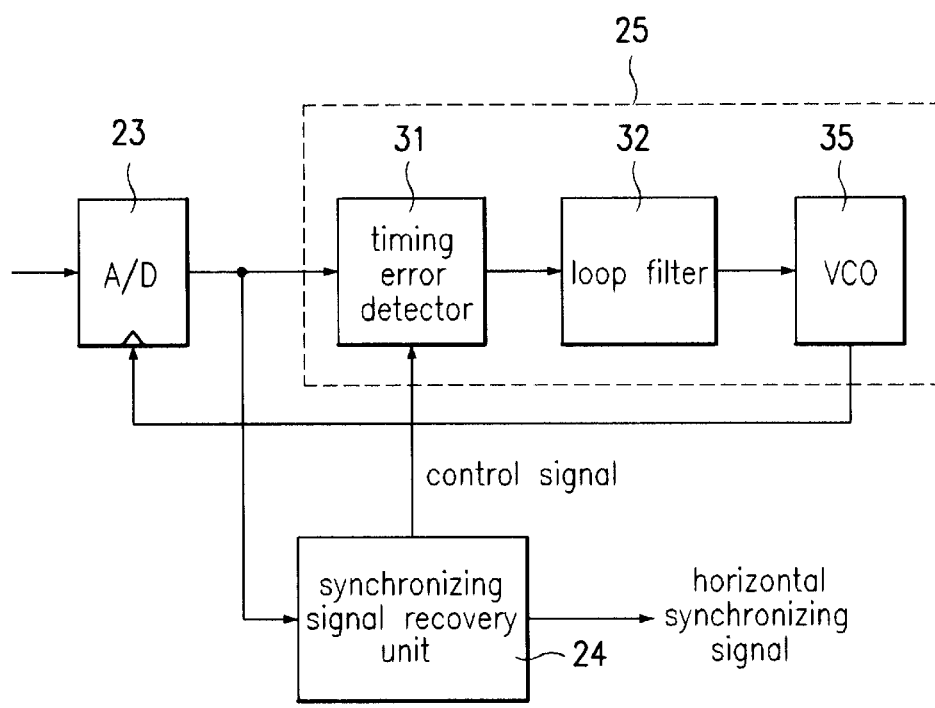
FIG. 3 is a block diagram of a timing recovery device of a digital TV in the related art.

Referring to FIG. 5, the timing recovery device includes a timing error detector 61, a loop filter 62 and a VCO 63 which respectively and generally correspond to elements 31, 32 and 35 described with respect to the timing recovery device of FIG. 3. Similarly, the sync signal recovery unit 70 includes a correlating detector 71, an integrator 72, a slicer 73 and a confidence counter 74 which respectively and generally correspond to elements 41–44 described with respect to the sync signal recovery unit 24 of FIGS. 3 and 4. However, in the present invention, the timing error detector 61 also receives the output of the correlating detector 71. The operation of the present invention will be described below.

Figure 4:
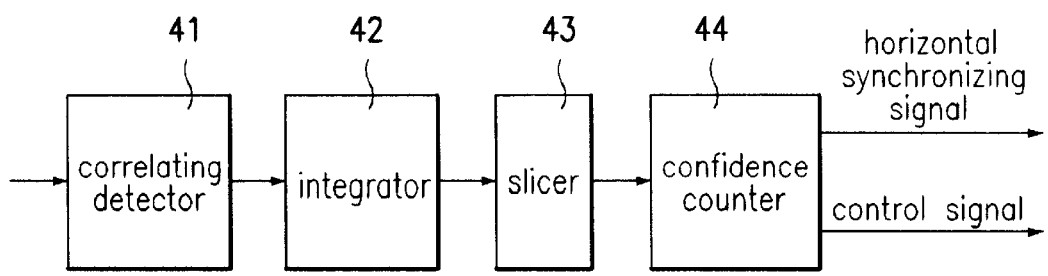
FIG. 4 is a block diagram of a horizontal synchronizing signal recovery unit of FIG. 3.

First, a digital signal output by the A/D converter 23 is sequentially processed through the correlating detector 71, the integrator 72, the slicer 73 and the confidence counter 74 as described with respect to elements 41–44 of FIG. 4. If the reliability is stacked over the second predetermined value, the confidence counter 74 generates the control signal to initiate the operation of the timing recovery unit 60. As in the related art, the control signal is used to discriminate whether the signal currently input to the timing error detector 61 is the hsync signal section. However, in the present invention, the timing recovery unit 60 stops operating if the hsync signal section is erroneously detected by the sync signal recovery unit 70.

Particularly, the timing error detector 61 operates when the control signal is output from the confidence counter 74 to initiate the operation of the timing recovery unit 60 and if the correlation relation between the currently input signal with the known hsync signal pattern, as obtained by the correlating detector 71, is over a third predetermined value. The timing error detector 61 independently determines whether the hsync signal section is correctly detected utilizing the correlation relation from the correlating detector 71. If the hsync signal section is erroneously detected, the correlation relation would be below the third predetermined value. Accordingly, if the correlation relation is under the predetermined value, the timing error detector 61 does not operate even in the state where the control signal transmitted from the sync signal recovery unit 70 indicates that an hsync signal section has been recovered.

Thus, the sync signal recovery unit 70 may continue to erroneously output the control signal indicating a recovery of the hsync signal due to a stacked reliability remaining in the confidence counter 74, but the timing error detector 61 would stop operation since the correlation relation output by the correlating detector 71 would be below the third predetermined value. Once the sync signal is correctly recovered by the sync signal recovery unit 70, the correlation relation output by the correlating detector 71 would be above the third predetermined value, and the timing error detector 61 would perform the timing recovery.

Moreover, in the present invention, the timing recovery unit 60 maintains its status when it stops operation, i.e. the characteristic of the output frequency of the VCO 63, which is controlled by the output of the loop filter 62, is not changed. Thus, if the hsync signal section is correctly detected, but is slipped by a few symbols due to a receipt of a signal not fully synchronous to the A/D clock generated by the timing recovery unit 60, the timing recovery unit 60 not only stops operation but maintains its status. Accordingly, once the hsync signal section is recovered in the slipped position, the timing recovery unit 60 may easily perform the timing recovery by adjusting the maintained previous status rather than performing the timing recovery from scratch. Therefore, the A/D clock of the A/D converter 23 can easily and quickly be adjusted, thereby increasing the efficiency of the system.

In the present invention, the basic operation of the timing recovery unit 60 is started under the control of the confidence counter 74 where the result of the sync signal recovery unit 70 is produced. Furthermore, whether the timing recovery unit 60 operates or not, every detected hsync signal section is under the control of the correlating detector 71 of the sync signal recovery unit 70. Consequently, when the phase or frequency between the clock used in the transmitting side and the clock generated at the initial operation of the timing recovery unit of the receiving side varies, the receiver can operate in a more stable and efficient manner.

The foregoing embodiments are merely exemplary and are not to be construed as limiting the present invention. The present teachings can be readily applied to other types of apparatuses, systems, or environments. The description of the present invention is intended to be illustrative, and not to limit the scope of the claims. Many alternatives, modifications, and variations will be apparent to those skilled in the art.

What is claimed is:

1. A method for recovering the timing in a digital TV, comprising:

activating a timing error detector when a control signal indicating a hsync signal section of an input digital signal is received from a sync signal recovery unit and if the detected hsync signal is reliable, and extracting a timing error information from the input digital signal;

filtering a low frequency signal component of the timing error information; and converting an output frequency in accordance with the low frequency signal component of the timing error information to adjust a sampling timing the input digital signal, wherein said control signal is output by determining a correlation relation of the input digital signal with a predetermined hsync signal pattern, adding the determined correlation relation for a period of 832 symbols to distinguish the hsync signal section from the digital signal, comparing the added value with a first predetermined threshold value and outputting a signal indicating the hsync signal section if the added value is over the first predetermined threshold value, and checking the reliability of the signal indicating the hsync signal section and outputting the control signal if the checked reliability is above a second predetermined value; and wherein the correlation relation is output to the timing error detector, and the timing error detector is activated when the control signal is received and if the correlation relation is above a third predetermined value.

2. A method of claim 1, further comprising:

maintaining the characteristic of the output frequency when the timing error detector stops activation.

3. A digital TV receiver comprising:

a timing recovery unit which extracts a timing error information from an input digital signal when a control signal indicating a hsync signal section of the input digital signal is received from a sync signal recovery unit and if the detected hysnc signal is reliable, filters a low frequency signal component of the timing error information, and converts an output frequency in accordance with the low frequency signal component of the timing error information to adjust a sampling timing the input digital signal; and a sync signal recovery unit which determines a correlation relation of the input digital signal with a predetermined hsync signal pattern, adds the correlation relation for a period of preset symbols to distinguish the hsync signal section from the digital signal, compares the added value with a first predetermined threshold value and outputs a signal indicating the hsync signal section if the added value is over the first predetermined threshold value, and checks the reliability of the hsync signal section and outputs the control signal indicating the hsync signal section if the checked reliability is above a second predetermined value, wherein said sync signal recovery unit includes:
a correlating detector which determines the correlation relation;
an integrator which adds an output of the correlating detector for a period of 832 symbols to distinguish the hsync signal section from the digital signal;
a slicer which compares an output value of the integrator with the first predetermined threshold value and outputs the signal indicating the hsync signal section if the output value is over the first predetermined threshold value; and
a confidence counter which checks the reliability of the hsync signal section output by the slicer and outputs the control signal if the checked reliability is above the second predetermined value; and
wherein the correlating detector outputs the correlation relation to the timing error detector, and the timing error detector is activated when the control signal is received and if the correlation relation is above a third predetermined value.

4. A digital TV receiver of claim 3, wherein the timing recovery unit comprises:
a timing error detector which extracts the timing error information from the input digital signal, said timing error detector activating when the control signal is received and if the detected hysnc signal is reliable;
a loop filter which filters the low frequency signal component of the timing error information; and
a VCO which converts the output frequency in accordance with the low frequency signal component of the timing error information to adjust a sampling timing the input digital signal.

5. A digital TV receiver of claim 3, wherein the timing recovery unit maintains the characteristic of the output frequency when the timing recovery unit stops activation.

6. A digital TV receiver of claim 3, further comprising:
a tuner which tunes an input RF signal to select a frequency of a desired channel and converts the selected frequency into an IF;
a FPLL which demodulates the IF signal into base band signals I and Q, and locks both the frequencies and the phases;
an A/D converter which converts the I signal from the FPLL into a digital signal of fixed bits according to the sampling timing of the input digital signal;
an equalizer/ECC which equalizes and performs an error correction on a restored hsync signal output by the sync signal recovery unit; and
a video decoder which decodes the equalized and error corrected signal utilizing a MPEG algorithm.

* * * * *